United States Patent [19]

Zweifel et al.

[11] 4,046,507
[45] Sept. 6, 1977

[54] COMMERCIAL PACKAGES CONTAINING DYESTUFFS

[75] Inventors: Hans Heini Zweifel, Binningen; Arthur Buehler, Rheinfelden; Alfred Fasciati, Bottmingen, all of Switzerland

[73] Assignee: Ciba-Geigy AG, Basel, Switzerland

[21] Appl. No.: 612,820

[22] Filed: Sept. 12, 1975

Related U.S. Application Data

[63] Continuation of Ser. No. 294,036, Oct. 2, 1972, abandoned, which is a continuation of Ser. No. 112,807, Feb. 4, 1971, abandoned.

[30] Foreign Application Priority Data

Feb. 6, 1970 Switzerland ............... 1776/70

[51] Int. Cl.$^2$ .............................................. D06P 3/66
[52] U.S. Cl. ............................................ 8/79; 8/1 A; 8/1 D; 8/1 E; 8/1 W; 8/65; 8/68; 8/163
[58] Field of Search ............... 8/79, 1 W, 1 D, 1 E, 8/1 A, 163, 68, 65; 252/90

[56] References Cited

U.S. PATENT DOCUMENTS 3,374,195 3/1968 Bianco et al. ............... 260/29.6

FOREIGN PATENT DOCUMENTS

| 982,196 | 2/1965 | United Kingdom | 8/1 W |
| 1,060,734 | 3/1967 | United Kingdom | 8/1 D |
| 1,242,689 | 8/1971 | United Kingdom | |

OTHER PUBLICATIONS

Ingamells, W.; Sumner, H. H. & Williams, G., J. Soc. Dyers Colourists, vol. 78, pp. 274–280 (1962).
Beech, W. F., Fiber Reactive Dyes, pp. 12–15 (1970).

*Primary Examiner*—John Kight, III
*Attorney, Agent, or Firm*—Karl F. Jorda; Edward McC. Roberts; Prabodh I. Almaula

[57] ABSTRACT

New commercial packages of organic dyestuffs, characterised in that they consist of an organic dyestuff or an optical brightener in dry, pulverulent form that is provided with a wrapping, which is soluble in a solvent suitable for the preparation of a dye solution or dye paste, and with the dyestuff or optical brightener so wrapped being optionally provided with a second wrapping that is preferably impervious to water.

6 Claims, No Drawings

COMMERCIAL PACKAGES CONTAINING DYESTUFFS

This application is a continuation of application Ser. No. 294,036, filed Oct. 2, 1972 now abandoned, which application is a continuation of application Ser. No. 112,807, filed Feb. 4, 1971 now abandoned.

The present invention relates to new commercial packages of synthetic dyestuffs and a process for the manufacture thereof using soluble pastic foil. The invention relates principally to packages that are made from water-soluble plastic foil and filled with water-soluble dyestuff powder, and a process for their manufacture.

It has become common practice to pack materials of the most diverse kinds — both in liquid and in solid form, including also dyestuffs — in plastic foils. These packages possess numerous advantages including, inter alia, the attractive appearance of the packed materials, the premeasuring of the contents so that on using them there is sufficient product available for effectively carrying out the task in hand. A further advantage lies in the reduction of those inconveniences connected with the use of bulk goods that give off dust, or are in any other way undesirable if they come into contact with the user — for example, contamination, irritation of the mucous membranes through dust particles etc. The wrappings of plastic foils, paper (cardboard) or metal which have been used hitherto were not soluble in the solvents normally employed, so that the removal of the wrapping (packing) before using the dyestuffs was unavoidable.

In place of the wrappings made from insoluble materials that have been used hitherto, the present invention contemplates the use of wrappings that are soluble in the same solvents as the dyestuffs that are encase by these wrappings. Thus, for example, dyestuffs that are soluble in acetone are advantageously sealed in an acetyl cellulose wrapping or coated with acetyl cellulose. Packages made of water-soluble foil are especially suitable for premeasured amounts of water-soluble dyestuffs, particularly of water-soluble reactive dyestuffs. The use of water-soluble packages is clearly more convenient and safer for the user, who simply throws the package into the water, without the opening and removal of the former water-insoluble wrappings being necessary.

The invention therefore provides new commercial packages containing dyestuffs consisting in an optionally blended or otherwise conditioned dyestuff that is sealed in a wrapping that is soluble in a solvent suitable for the preparation of a dye solution or paste. The wrapping can form, for example, a coating around dyestuff pastilles or granules, or it can be a plastic foil, for example in the form of a bag, in which the a dyestuff powder is packed.

Possible water-soluble wrappings are film forming, water-soluble mucins and polysacharides, for example hydroxyalkylcellulose, carboxymethylcellulose, polyvinylmethylether/maleic anhydride copolymers and chiefly, polyvinylalcohol or polyvinylalcohol plasticised with, for example, ethylene glycol or with some other substance that does not exert any substantial influence on the dissolution of the polyvinylalcohol in water.

In making a suitable choice of the material use for forming the wrapping, virtually all types of dyestuffs may be considered. Vatted vat and disperse dyestuffs, optionally together with the wetting and dispersing agents necessary for their dispersion in water, can be provided appropriately with water-soluble wrappings. However, water-soluble dyestuffs, which is to say both metalliferous and metal-free monoazo an polyazo dyestuffs, anthraquinone, nitro, formazane and phthalocyanine dyestuffs are used with advantage. In the present invention, particular interest attaches to the fibre reactive dyestuffs of all classes. These dyestuffs are known in such vast number that any further discussion of them is here superfluous.

The commercial packages are manufactured accoring to the invention in such a way that dyestuff powder is sealed into a soluble wrapping or dyestuff pastilles or granules are coated with a soluble wrapping. Solutions, for example of the substances that form the coating, are used to form the wrapping. The solutions mentioned are then applied to the dyestuff pastilles (dyestuff capsules or granules) by one of the known processes, for example in a rotating coating tank. The manufacture of dyestuff microcapsules is less recommendable, since in the case of microcapsules, the amount of the material forming the coating is so large in relation to the amount of dyestuff that it is of too great importance on the subsequent use in the dyebath and can no longer be disregarded.

Another method of obtaining the commercial packages according to the invention consists in working the dyestuffs into a melt or solution of an appropriate film forming material such, for example, as polyvinylalcohol or polyethylenglycol with an average molecular weight of between 3000 and 10,000, leaving the resulting mass to solidify and crushing it into granules, with the amount of the film forming material per tablet being so large the the pulverulent dyestuff is completely coated.

The usual methods known in industry are employed to manufacture small sacks or larger packages. A polyvinylalcohol foil can thus be sealed hot. The packages can also be formed in any other way and the content of the package can be introduced in any manner desired. For example, a pliable polyvinylalcohol strip can be introduced into a filling and packing machine, there formed into a tube and this in turn filled with the dyestuff that is to be packed, and by compressing it diagonally to its longitudinal direction, formed into sealed containers. Preferred methods of forming the packages of plastic foil are described on pages 395–396 of the "Encyclopedia Issue for 1958" of Modern Packaging, 31, No. 3A, and in U.S. Pat. No. 2,936,263. According to another preferred method of forming the packages, water is applied to the film, immediately before the package is formed, either by coating it or in some other way, and in such an amount that the film becomes tacky. Both layers of film are then sealed together by pressure alone, without the application of heat, while the film is still tacky.

The water-soluble foil suitable for the manufacture of the packs can be manufactured from numerous qualities of commercially used polyvinylalcohol. However, water-soluble foil of this material is also suitable that contains 0 to approximately 20% of polyvinylacetate. The polyvinylalcohol used for the manufacture of the films can be plasticised internally. The internal plasticising occurs, for example, by ethoxylation of the polyvinylalcohol in the manner described in U.S. Pat. No. 1,971,662. The plasticising by means of ethoxylation prevents the plastic becoming brittle and therefore its tear resistance (tensile strength) is increased to a certain extent. It is known that brittleness is the cause of the premature tearing of packs made from polyvinylalcohol foil due to the action of bumps. It is also known that the strength of a polyvinylalcohol film depends on its water content. It so happens that water-soluble foil is by nature pervious to water vapour and therefore easily attains the equilibrium of its moisture content with the equilibrium of the ambient atmosphere. The problem cannot be simply solved therefore by increasing the moisture content of the foil or by adding to the foil a hygroscopic material such as glycerine, since the foil quickly loses the absorbed water by evaporation until its water content is in equilibrium with the ambient atmosphere, so that the foil dries out to a moisture content that is too slight at low temperatures to maintain the foil in the desired plastic state.

The correct moisture content of a package made from water-soluble polyvinylalcohol foil, which is filled with dyestuff powder, can be maintained (and thus premature rupture on normal bumps and shocks avoided) be sealing into the package an inorganic or organic salt hydrate, which possesses certain properties, in such an amount that the relative moisture of the atmosphere in the package is kept at a sufficiently high level to maintain the moisture content of the foil at the desired value, even if the external moisture has very low values. The hydrate present in the content of the water-soluble package can be added to the dyestuff to be packed at any stage of the processing before the pre-packing.

Examples of inorganic salt hydrates that are suitable for the purpose of the invention are: magnesium sulphate heptahydrate ($MgSO_4.7 H_2O$), sodium acetate trihydrate ($NaC_2H_3O_2.3 H_2O$), sodium sulphate heptahydrate ($NaSO_4. 7 H_2O$) and sodium sulphate decahydrate ($Na_2SO_4. 10 H_2O$). Other extenders that are customary in the dyestuffs industry, for example urea, dextrin, dispersion agents and the like, can likewise be added to the dyestuff powders.

The thickness of the water-soluble foil that can be used for the packages according to the invention is between 6 and 75 u. Thinner foil does not have the necessary tear (tensile) strength to support the weight of the contents of the pack without tearing, whereas thicker foil is uneconomic from the point of view of costs. Several filled individual packages made from water-soluble foil can be fitted into one box for storing or dispatch, and several boxes can be packed into one dispatch container normally consisting of cardboard or some other rigid or stiff material, which provides additional protection. The individual packs can also be packed directly in a despatch container.

If dyestuff wrappings of polyvinylalcohol are used, it is necessary in most cases to provide these with airtight and moisture-proof second wrapping, for example a wrapping of polyvinylchloridepolyester or polypropylene, in order to increase the tear resistance (tensile) strength) and also the wet strength, i.e. to prevent the water-soluble polyvinylalcohol wrapping from dissolving in moist air. On the other hand, the second coating prevents the polyvinylalcohol wrapping from drying out too much in dry air, which leads to embrittlement. Accordingly, too much drying out at the welded joint is also to be avoided on heat-sealing polyvinylalcohol foil.

By means of a suitable opening mechanism, for example a pull string, the polyvinylalcohol wrapping with its dyestuff contents can be extracted before use from the airtight, sealed (for example, heat-sealed polyester) covering.

The use of a wrapping of polyvinylalcohol which, depending of the (relatively high) degree of hydrolysis, is insoluble in cold water (for example, below 40° C), but is readily soluble in warm water, is in many cases particularly advantageous. In such cases, the use of an additional (outside) protective wrapping can be dispensed with.

Generally speaking, however, the use of an outside wrapping, for example as protection against moisture and must therefore preferably e of some impervious and tear-resistant especially to improve the mechanical stability, is to be recommended, also if the (inner) wrapping consists of another material instead of polyvinylalcohol. This (outside) wrapping must therefore preferably be of some impervious and tear-resistant material. Depending on the material of the inner wrapping, aluminium, paper, cellophane, polyester, polyvinylchloride, polyvinylidene chloride or polypropylene may be considered for the material of the outer wrapping. If the inner wrapping consists of a transparent substance, then transparent material is likewise used with advantage for the outer wrapping, so that the shade of the encased dyestuff may be seen from the outside.

The new commercial packages are also suitable for optical brighteners, since these to some extent are very much inclined to give off dust. This property is, however, particularly disadvantageous because the traces are not immediately visible and a stripping or levelling up is to all intents and purposes no longer possible.

The same materials can be dyed with the new commercial packages according to the invention as with the dyestuffs that may be sonsidered. They can be used directly for manufacturing the required dyebaths without the soluble wrappings being removed beforehand. They thereby offer advantages such as saving of time and trained personnel, since no preliminary taring is necessary, but only a count of the packages, which all contain the same amount of dyestuff. The new commercial packages of the invention are furthermore more storage-proof than the dyestuff powder that they contain, since their more compact bulk offers smaller working surfaces to harmful environmental influences than powder a factor which can be particularly important in the case of reactive dyestuffs.

On using polyvinylalcohol as the foil material there accrues the advantage that the addition of polyvinylalcohol to the dyebath, even in large amounts, has virtually no detrimental effect on the dyeing and that, moreover, the solubility of difficulty soluble dyestuffs in the presence of polyvinylalcohol is increased.

In the examples that follow, the parts and percentages are by weight, unless otherwise stated.

EXAMPLE 1

A granular powder is manufactured by spray drying the manufacturing mixture of the dyestuff from γ-acid and diazotised 2-sulpho-4-(α-bromacrylamino)-aniline and packed by heat-sealing in packages, which consist of a 38μ water-soluble film of polyvinylchloride.

To prepare dyebaths, the resulting dyestuff packages are dissolved directly in water without the polyvinyl film being removed or brought into solution by special means. With the thus prepared dyebaths it is possible, if desired, to dye wool by the usual method in fast red shades after addition of the otherwise desired dyeing assistant.

EXAMPLE 2

55 parts of the dyestuff of the formula are neutralised in 1000 parts of water with 2N sodium hydroxide solution and mixed with 16,4 parts of anhydrous sodium acetate. While stirring vigorously, a solution of 25 parts of α,β-dibromopropionyl chloride is added dropwise at 0° to 5° C over the course of 30 minutes. After a short time the amino group is completely acylated. The resulting dyestuff is precipitated in the usual way by addition of sodium chloride, separated by filtration, ground and dried. 10% sodium sulphate heptahydrate is added to the resulting dyestuff powder. The mixture is subsequently packed in packages, which consist of a 38μ thick water-soluble film of polyvinylalcohol. The dyestuff packets obtained in this way dye wool from a neutral to acetic bath in red shades fast to wet and light.

Dyeing Instruction 4 packets of 500 g each of this dyestuff are dissolved in 4000 liters of water; 10kg of crystalline sodium sulphate and 0,5 kg of an ethylene oxide addition product of oleylamine are added and 100 kg of thoroughly soaked wool are introduced into the resulting dyebath at 40° to 50° C. Thereupon 2 kg of 40% acetic acid are added, the bath is brought to the boil within half an hour and dyeing carried out at the boil for ¾ hour. Finally, the wool is rinsed with cold water and dried. The wool is dyed in red shades having fastness to washing and of good fastness to light.

Manufacture of the ethylene oxide addition product 100 parts of industrial oleylamine are mixed with one part of finely distributed sodium and heated to 140° C, whereupon ethylene oxide is introduced at 135° to 145° C. As soon as the ethylene oxide has been rapidly taken up, the reaction temperature is lowered to 120° to 125° C and the running in of the ethylene oxide continued until 113 parts of it have been taken up. The resulting reaction product is soluble practically to a clear solution in water.

Further examples of dyestuffs and optical brighteners in the form of the new commercial product are provided in the following table, wherein there is indicated: in column I, the dyestuffs or brighteners respectively; in column II, possible additives; in column III the material of the inner wrapping and in column IV, that of the outer wrapping; and in column V, a suitable solvent for the inner wrapping.

| I | II | III | IV | V |
|---|----|-----|----|----|
| Acid Orange 3 C.I. 10 385 | Sodium sulphate Dextrin | PVA | Paper | Water Ethanol |
| Dispers Red 13 C.I. 11115 | sodium chloride | PVA | PP | Ethanol Acetone |
| Acid Yellow 9 C.I. 13015 | sodium chloride | PVA | PP | Water |
| Acid Orange 50 C.I. 13150 | Dextrin Disposing agent | PVA | PP | Water Ethanol Cellulose |
| Acid Blue 89 C.I. 13405 | Phosphate | PVA | Paper | Water Ethanol |
| Acid Green 12 C.I. 13425 | Sodium chloride Dextrin | PVA | Paper | Water Ethanol |
| Mordant Yellow 18 C.I. 13990 | Disposing agent | PVA | Paper | Water Acetone |
| Acid Red 3 C.I. 14910 | Phosphate | PVA | PP | Water Ethanol |
| Acid Violet 13 C.I. 16640 | — | PVA | PP | Water Ethanol |
| Acid Yellow 13 C.I. 19120 | — | PVA | PP | Water |
| Acid Brown 43 C.I. 20300 | — | PVA | PP | Water |
| Acid Blank 1 C.I. 20470 | Sodium chloride Dextrin | PVA | PP | Water Ethanol |
| Direct Red 54 C.I. 29215 | Phosphate | PVA | PVC | Water |
| Direct Blue 82 C.I. 34130 | Phosphate | PVA | PVC | Water |
| Fluorescent Brightening Agent 32 C.I. 40620 | — | PVA | Alu | Water |
| Basic Violet 3 C.I. 42555 | — | EC | Cph | Ethanol Water |
| Acid violet 17 C.I. 42650 | — | EC | PE | Water Ethanol |
| Basic Red 8 C.I. 45150 | — | MeC | PE | Water Ethanol |
| Basic Orange 15 C.I. 46045 | — | CMec | PE | Water Ethanol |
| Mordant Blue 59 C.I. 51125 | Sodium chloride | HEC | PE | Water Ethanol |
| Vat Blue 18 C.I. 59815 | — | AcC | PP | Acetone |
| Dispers Red 9 C.I. 60505 | — | AcC | PVC | Acetone Ethanol |
| Acid Green 36 C.I. 61595 | Sodium sulphate Dextrin | CEC | PVC | Water |
| Reactive Blue 5 C.I. 61210 | Sodium chloride | CMeC | PP | Water |
| Acid Blue 249 C.I. 74220 | Sodium chloride | HEC | PP | Water |
| Acid Blue 193 C.I. 15707 | — | MeC | PP | Water |
| Acid Violet 92 C.I. 15708 | — | MeC | PP | Water |

Key:
PVA = Polyvinylalcohol
PP = Polypropylene
PE = Polyester
PVC = Polyvinylchloride
CpH = Cellophane
Alu = Aluminum
MeC = Methylcellulose
EC = Ethylcellulose
HEC = Hydroxyethylcellulose
CMeC = Carboxymethylcellulose
CEC = Carboxyethylcellulose
AcC = Acetylcellulose Equally good dyeing results are obtained if dyebaths or printing pastes respectively are prepared with polyvinylalcohol packs that contain dyestuffs of the following formulae:

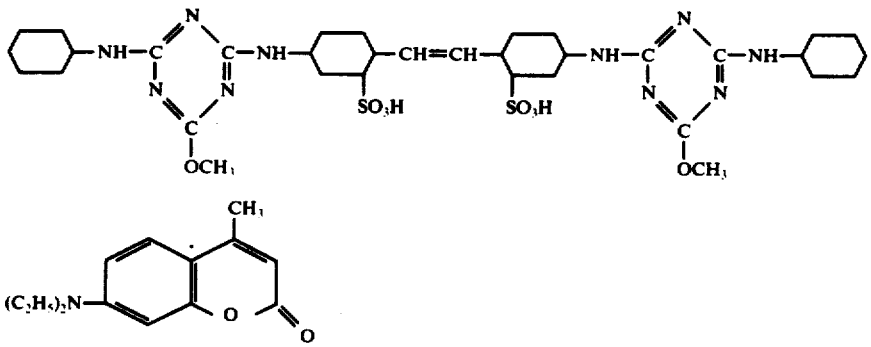

If the 1:2 cobalt complex of the dyestuff of the formula is used for the spinning solution dyeing of acetate rayon, i.e. for dyeing a solution of acetylcellulose in acetone before spinning, the dyestuff is likewise used preferably in an acetylcellulose wrapping.

As optical brighteners of the stilbene or cumarin series there may be mentioned further those of the formulae

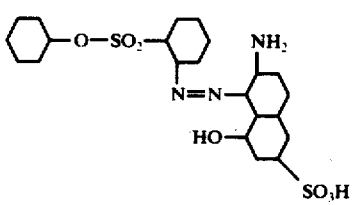

which are also used with advantage in the new commercial packages.

We claim:

1. A process for the preparation of an aqueous dyebath or aqueous printing paste, comprising the step of adding to the aqueous medium a dry pulverulent, water-soluble, fiberreactive dyestuff wrapped in a water-soluble foil material selected from the group consisting of mucin, hydroxyalkylcellulose, carboxymethylcellulose, polyvinylmethylether/maleic anhydride copolymer and polyvinylalcohol.

2. The process of claim 1, wherein the foil material is polyvinylalcohol.

3. The process of claim 2, wherein the dyestuff is a monoazo dyestuff.

4. The process of claim 2, wherein the dyestuff is an anthraquinone dyestuff.

5. The process of claim 2, wherein the dyestuff contains a fiber-reactive group which is a halo-1,3,5-triazinyl group or a haloacyl group.

6. The process of claim 1, wherein the dyestuff is admixed with a dry, pulverulent optical brightener material.

* * * * *